(12) United States Patent
Dernis (10) Patent No.: US 8,782,557 B2
(45) Date of Patent: Jul. 15, 2014

(54) ORDERED MULTIPLE SELECTION USER INTERFACE

(75) Inventor: Mitchell Stephen Dernis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 775 days.

(21) Appl. No.: 12/147,279

(22) Filed: Jun. 26, 2008

(65) Prior Publication Data

US 2009/0327960 A1 Dec. 31, 2009

(51) Int. Cl.
G06F 3/14 (2006.01)
(52) U.S. Cl.
USPC ........... 715/823; 715/816; 715/821; 345/790; 725/5; 725/38; 84/604; 707/101; 707/200
(58) Field of Classification Search
USPC ........... 715/823, 821, 860; 386/292; 707/200, 707/706; 725/5
See application file for complete search history.

(56) References Cited

U.S. PATENT DOCUMENTS

| | | | | |
|---|---|---|---|---|
| 5,664,133 | A * | 9/1997 | Malamud et al. | 715/816 |
| 5,706,449 | A * | 1/1998 | Liu et al. | 715/823 |
| 5,742,286 | A | 4/1998 | Kung et al. | 715/839 |
| 5,828,376 | A * | 10/1998 | Solimene et al. | 715/821 |
| 6,240,430 | B1 | 5/2001 | Deike et al. | 715/210 |
| 2002/0196293 | A1 | 12/2002 | Suppan et al. | 715/853 |
| 2004/0090467 | A1 * | 5/2004 | Bonura et al. | 345/790 |
| 2004/0135817 | A1 | 7/2004 | Daughtery et al. | 715/823 |
| 2006/0015899 | A1 * | 1/2006 | Liebhold et al. | 725/38 |
| 2006/0070007 | A1 | 3/2006 | Cummins et al. | 715/769 |
| 2006/0074928 | A1 | 4/2006 | MacLaurin et al. | 707/100 |
| 2006/0196345 | A1 * | 9/2006 | Arai | 84/604 |
| 2007/0061756 | A1 | 3/2007 | Parrish et al. | 715/823 |
| 2007/0239792 | A1 * | 10/2007 | Chen et al. | 707/200 |
| 2008/0040686 | A1 | 2/2008 | Ice et al. | 715/823 |
| 2008/0168076 | A1 * | 7/2008 | Chang et al. | 707/101 |
| 2009/0220216 | A1 * | 9/2009 | Marsh et al. | 386/124 |
| 2010/0228715 | A1 * | 9/2010 | Lawrence | 707/706 |
| 2011/0231867 | A1 * | 9/2011 | Williams et al. | 725/5 |

OTHER PUBLICATIONS

David Pogue, "Windows XP Home Edition: The Missing Manual", Dec. 16, 2004, O'Reily Media Inc., Second Edition, pp. 75-77.*
Lucas et al., "Design and Evaluation of 3D Multiple Object Selection Techniques," Center for Human Computer Interaction, Virginia Tech, http://www.people.cd.vt.edu/~bowman/cs6724/lucas_mos.pdf, 2005, 10 pages.
DeVenezia, R., "Using context sensitive popmenus to enter values in a SAS/AF Data Table object," SAS Institute, Inc., http://www.devenzia.com/papers/nesug-1999/NESUG-1999.pdf, 1996, 8 pages.

* cited by examiner

Primary Examiner — Ruay Ho
(74) Attorney, Agent, or Firm — Micah Goldsmith; Judy Yee; Micky Minhas (57) ABSTRACT

Techniques and mechanisms providing a visual indication of ordinal ranks of objects in an ordered list. When an object is selected for the ordered list, an ordinal rank for the object within the ordered list is determined and a visual indication of the ordinal rank is rendered to a user interface.

9 Claims, 6 Drawing Sheets

| | 307 | 308 | 309 | |
|---|---|---|---|---|
| | Name | Size | Last Modified | 301 |
| | Blue Monk | 4,155 KB | 9/8/2007 4:31 PM | 302 |
| | Crepuscule with Nellie | 5,598 KB | 5/14/2007 3:11 PM | 303 |
| | Ghost of a Chance | 2,957 KB | 12/20/2006 2:10 AM | 304 |
| | Memories of You | 3,725 KB | 1/12/2008 9:18 AM | 305 |
| | Panonica | 3,089 KB | 9/8/2007 4:31 PM | 306 |

| 410 | 407 | 408 | 409 | |
|---|---|---|---|---|
| # | Name | Size | Last Modified | 401 |
| | Blue Monk | 4,155 KB | 9/8/2007 4:31 PM | 402 |
| 412 — 2 | Crepuscule with Nellie | 5,598 KB | 5/14/2007 3:11 PM | 403 |
| 411 — 1 | Ghost of a Chance | 2,957 KB | 12/20/2006 2:10 AM | 404 |
| | Memories of You | 3,725 KB | 1/12/2008 9:18 AM | 405 |
| 413 — 3 | Panonica | 3,089 KB | 9/8/2007 4:31 PM | 406 |

| | 507 | 508 | 509 | |
|---|---|---|---|---|
| | Name | Size | Last Modified | 501 |
| | Blue Monk | 4,155 KB | 9/8/2007 4:31 PM | 502 |
| 511 — 2 | Crepuscule with Nellie | 5,598 KB | 5/14/2007 3:11 PM | 503 |
| 510 — 1 | Ghost of a Chance | 2,957 KB | 12/20/2006 2:10 AM | 504 |
| | Memories of You | 3,725 KB | 1/12/2008 9:18 AM | 505 |
| 512 — 3 | Panonica | 3,089 KB | 9/8/2007 4:31 PM | 506 |

ORDERED MULTIPLE SELECTION USER INTERFACE

BACKGROUND

Computer user interfaces typically provide mechanisms for users to select objects. The objects may represent anything that can be accessed via a user interface. Some examples of such objects are files, icons, sections of text, graphic objects, hyperlinks, cells in a spreadsheet, and OLE objects.

A user often needs to select one or more objects on which to perform some function. The functions available to be performed on the object generally will depend on the kind of object. For example, with file objects, available functions might include operations such as open, copy, move, delete, print, rename, encrypt, and the like. With text objects, functions might include copy, delete, cut, format, and the like.

One method for a user to select an object is to move a cursor to a representation of the object and to click on the representation using a mouse. Multiple objects may be selected by, for example, holding down the CONTROL key while clicking on representations of the objects using a mouse. A group of objects may be selected by, for example, selecting a first object and then holding down the SHIFT key while selecting the last object in the group. As another example, a user may navigate among and select representations of objects using a keyboard. In some cases, a list of objects may be presented with a checkbox next to each item in the list. Objects may be selected by checking the appropriate boxes.

When an object is selected, a visual indication of the selection may be provided to the user. For example, the representation of the object may be modified in some manner such as a change in color of the representation of the object, or of the background for the representation, or both. As another example, the color or font of text in the representation may be altered in some manner to indicate the selection. A highlight area may be rendered around the representation of the object.

SUMMARY

This Summary is provided to introduce a selection of concepts in a simplified form that are further described below in the Detailed Description. This Summary is not intended to identify key features or essential features of the claimed subject matter, nor is it intended to limit the scope of the claimed subject matter.

Techniques and mechanisms providing a visual indication of ordinal ranks of objects in an ordered list are described herein. A user interface provides representations of objects, such as for example files, in a computing environment. When objects are selected, an ordinal rank for the selection of the object within an ordered list is determined and a visual indication of the ordinal rank is rendered in the user interface.

DETAILED DESCRIPTION OF ILLUSTRATIVE EMBODIMENTS

The subject matter below is described with specificity to meet statutory requirements. However, the description itself is not intended to limit the scope of this patent. Rather, the inventor has contemplated that the claimed subject matter might also be embodied in other ways, to include different steps or elements similar to the ones described in this document, in conjunction with other present or future technologies.

Example Computing Environment

Figure 1:
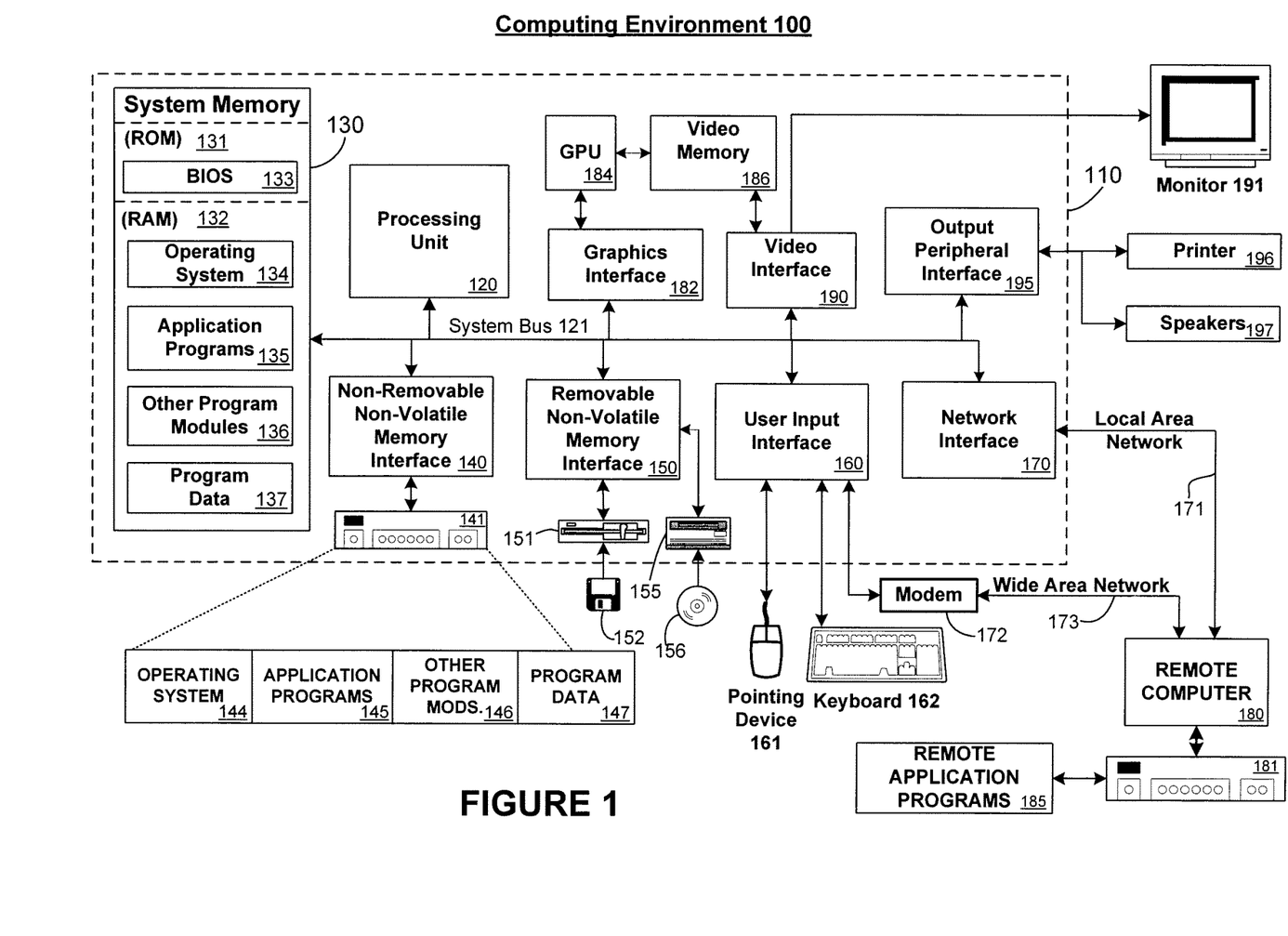
FIG. 1 is an example computing environment in which aspects of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the example operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. Typically the functionality of the program modules may be combined or distributed as desired in various embodiments. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read-only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146 and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Example Distributed Computing Frameworks or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While example embodiments herein are described in connection with software residing on a computing device, one or more portions of the invention may also be implemented via an operating system, API, or middleware software between a coprocessor and requesting object, such that services may be performed by, supported in, or accessed via all of .NET's languages and services, and in other distributed computing frameworks as well.

Network Environment

Figure 2:
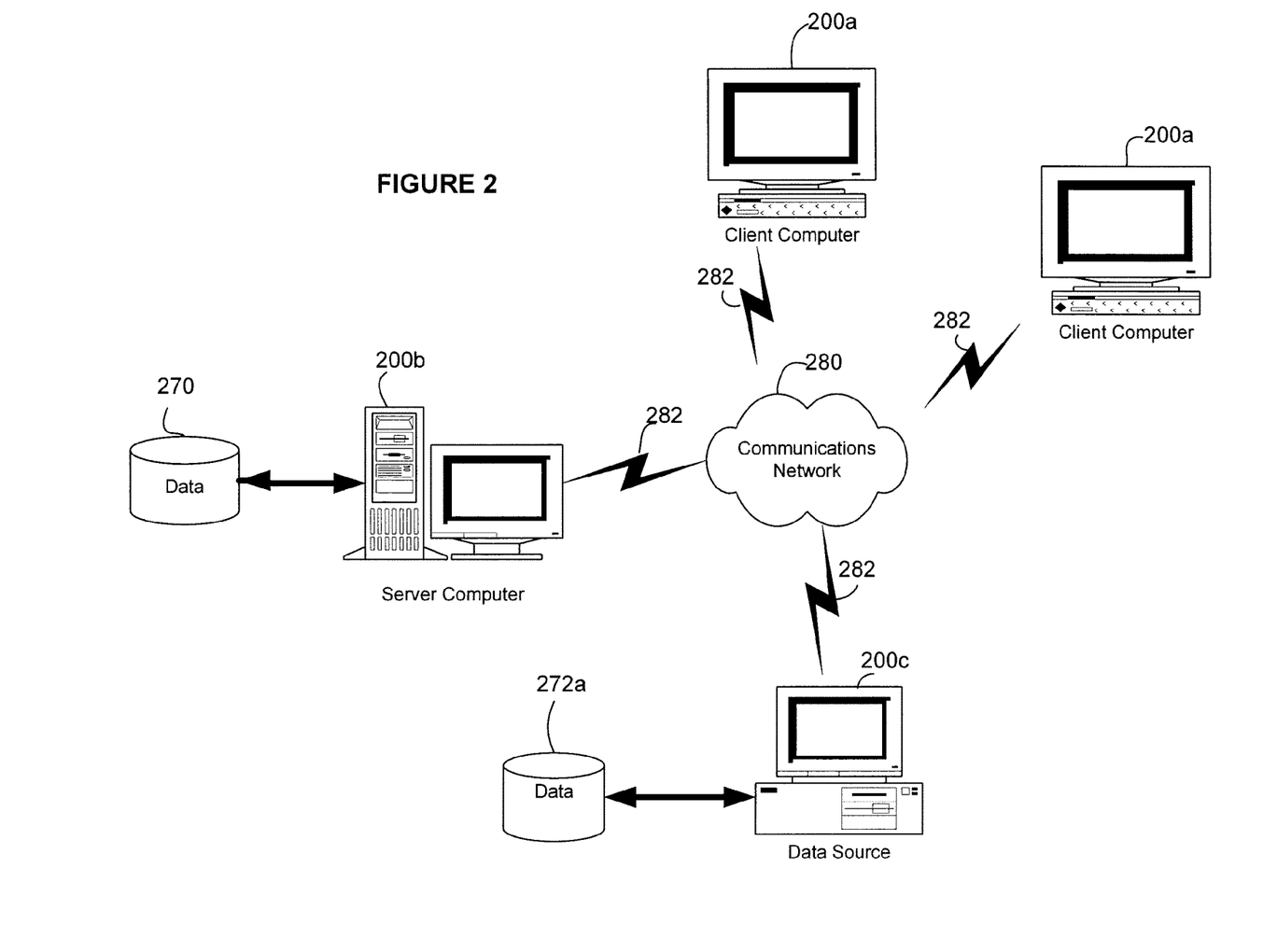
FIG. 2 is an example network configuration in which aspects of the invention may be implemented.

FIG. 2 illustrates an example network environment in which the present invention may be employed. Of course, actual network and database environments may be arranged in a variety of configurations; however, the example environment shown here provides a framework for understanding the type of environment in which an embodiment may operate.

The example network may include one or more client computers 200a, a server computer 200b, data source computers 200c, and/or databases 270, 272a, and 272b. The client computers 200a and the data source computers 200c may be in electronic communication with the server computer 200b by way of the communications network 280 (e.g., an intranet, the Internet or the like). The client computers 200a and data source computers 200c may be connected to the communications network by way of communications interfaces 282. The communications interfaces 282 can be any type of communications interfaces such as Ethernet connections, modem connections, wireless connections and so on.

The server computer 200b may provide management of the database 270 by way of database server system software such as MICROSOFT®'s SQL SERVER or the like. As such, server 200b may act as a storehouse of data from a variety of data sources and provides that data to a variety of data consumers.

In the example network environment of FIG. 2, a data source may be provided by data source computer 200c. Data source computer 200c may communicate data to server computer 200b via communications network 280, which may be a LAN, WAN, Intranet, Internet, or the like. Data source computer 200c may store data locally in database 272a, which may be database server or the like. The data provided by data source 200c can be combined and stored in a large database such as a data warehouse maintained by server 200b.

Client computers 200a that desire to use the data stored by server computer 200b can access the database 270 via communications network 280. Client computers 200a access the data by way of, for example, a query, a form, etc. It will be appreciated that any configuration of computers is equally compatible with an embodiment of the present invention.

Example Embodiments

An embodiment of the invention provides a mechanism for presenting to a user indications of the order of objects in an ordered list of objects. Although the following discussion will focus on objects that represent computer files, those skilled in the art will recognize that the mechanisms described herein may be applied to any objects that are capable of being represented in a computing system.

Figure 3:
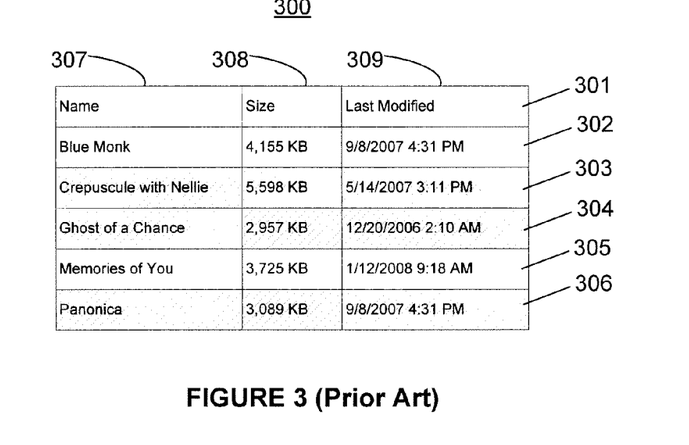
FIG. 3 is an example user interface.

FIG. 3 depicts a representation of a collection of computer files presented in a table view 300. The table 300 comprises a header row 301 and a collection of rows 302-306, where each row is an object that represents a computer file. The table has columns 307-309 holding various information, as specified in the header row 301, about each file. Three of the rows 303, 304, 306 are shown as highlighted, as shown by cross-hatching, to indicate that the files they represent have been selected via a user interface. The selection may or may not be an ordered list. The table view 300 provides no information about the order in which the objects represented by the three rows 303, 304, 306 were selected. Such an interface may be provided, for example, by a List View Control in Windows Explorer.

There are numerous reasons why the order of selection of objects in a collection may be important in various situations. For example, if the selected objects are music files to be sent to a playlist, it may be desirable to have the files played in a specified order such as selected. As another example, if a collection of files are to be written to an optical disk, it may be desirable to specify an explicit order for the files to be written so as to optimize read timing for the written disk. In general, it may be desirable to perform some order-dependent action on a selection of objects in a specified order of selection. In the table view of FIG. 3, a user is provided no indication of the order of selection of the three selected files.

Figure 4:
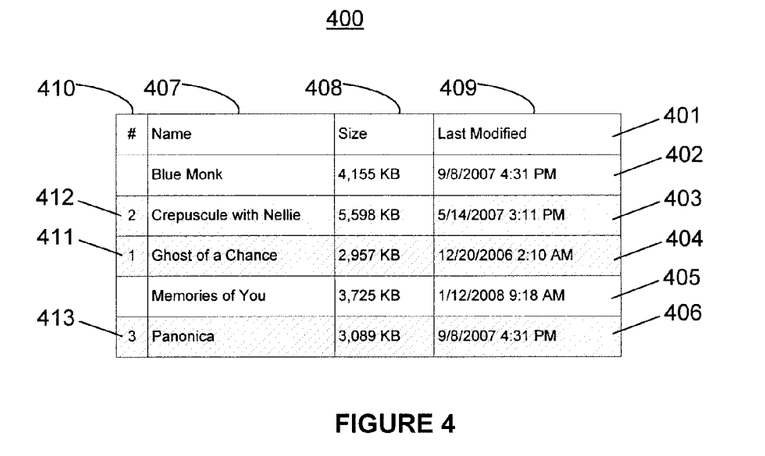
FIG. 4 is an example user interface in accordance with the teachings herein.

FIG. 4 depicts a table view representation 400 of an example embodiment of a user interface in accordance with the disclosure herein. The objects represented in the table are the same computer files as shown in FIG. 3. The table 400 comprises a header row 401 and a collection of rows 402-406, where each row again represents a computer file. The table has columns 407-409 holding various information, as specified in the header row 401, about each file. Three of the rows 403, 404, 406 are shown as highlighted to indicate that the files they represent have been selected via a user interface. In this example, the files have been selected in a particular order. An additional column 410 is presented in the table for displaying information about the order of selected files within an ordered list of files. The ordinal numeral "1" is displayed in the cell 411 in column 410 and row 404, indicating that the file represented by row 404 is first, i.e., has an ordinal ranking of "1", in an ordered list of files. Similarly, ordinal numerals "2" and "3" are displayed in cells 412 and 413 respectively, indicating that the files represented by rows 403 and 406 are second and third respectively in the ordered list of files.

Figure 5:
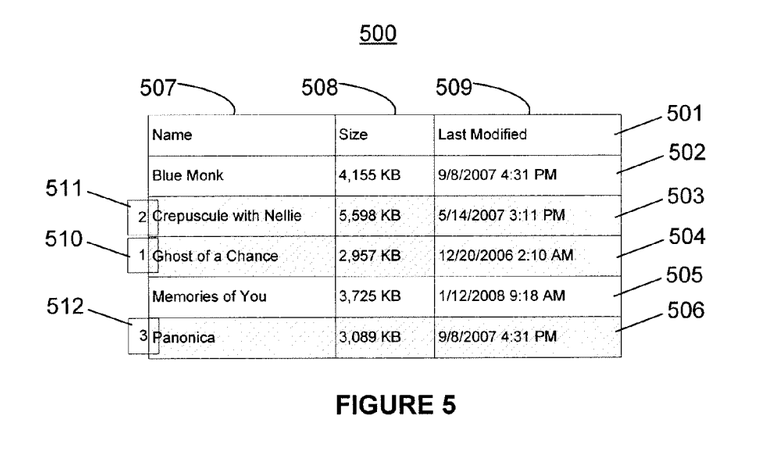
FIG. 5 is another example user interface in accordance with the teachings herein.

FIG. 5 depicts a table view representation 500 of another example embodiment of a user interface in accordance with the disclosure herein. The objects represented in the table are the same computer files as shown in FIGS. 3 and 4. The table 500 comprises a header row 501 and a collection of rows 502-506, where each row again represents a computer file. The table has columns 507-509 holding various information, as specified in the header row 501, about each file. Three of the rows 503, 504, 506 are shown as highlighted to indicate that the files they represent have been selected via a user interface. Semi-transparent windows 510, 511, and 512 have been rendered proximate to the rows 504, 503, and 506 respectively. The ordinal numeral "1" is displayed in the window 510, indicating that the file represented by row 504 is first in an ordered list of files. Similarly, ordinal numerals "2" and "3" are displayed in windows 511 and 512 respectively, indicating that the files represented by rows 503 and 506 are second and third respectively in the ordered list of files.

Note that although ordinal numerals are used in the examples provided herein to indicate the ordinal rank of selected objects within an ordered list, any visual indication of ordinal rank may be used, either instead of or in addition to ordinal numerals. For example, letters may be used to indicate order. Differences in highlighting of selected objects, such as different intensities or colors, may be used to indicate order.

Figure 6:
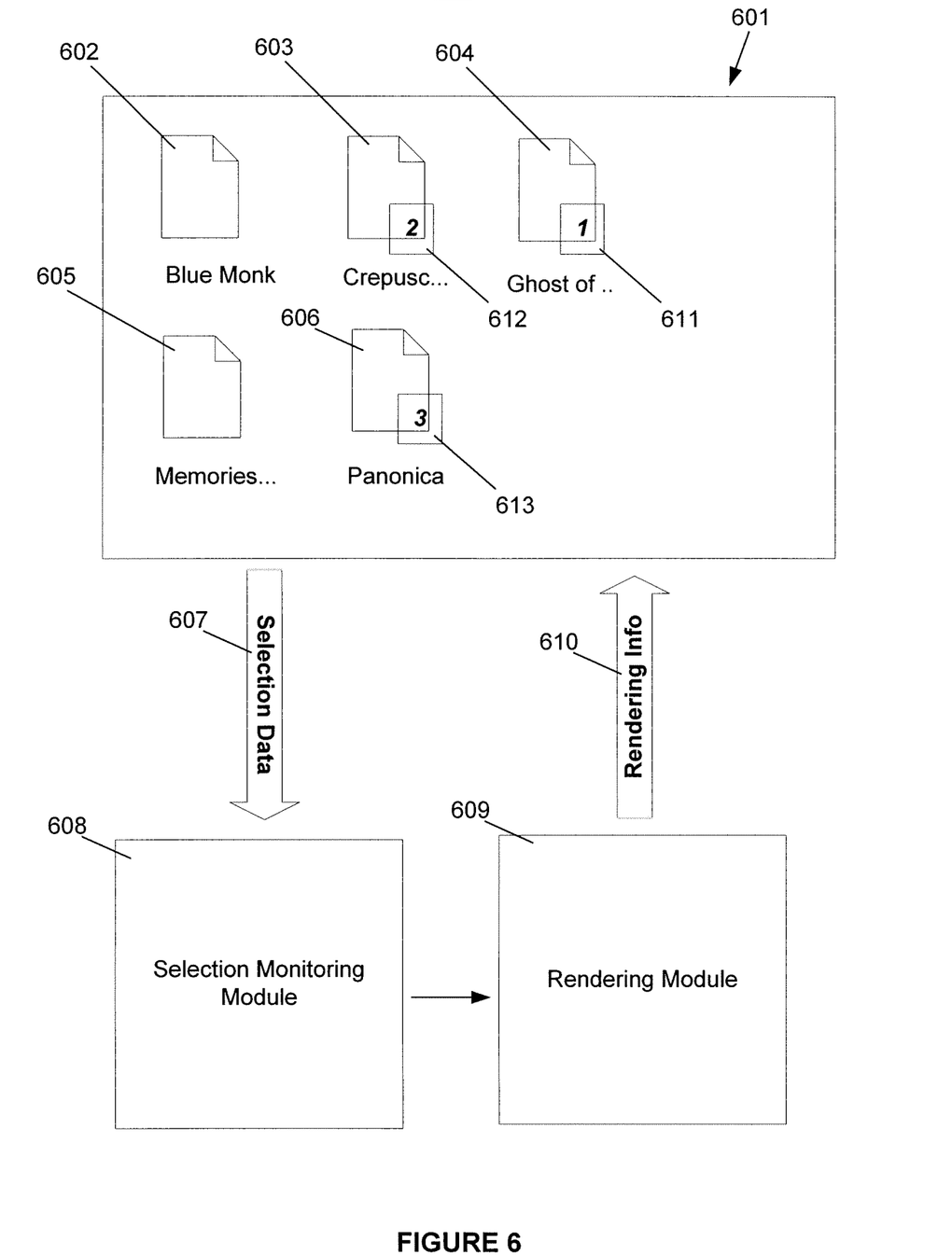
FIG. 6 is a simplified block diagram of an example of an embodiment of a system in accordance with the teachings herein.

FIG. 6 is a simplified block diagram of an embodiment of a system 600 that may implement the techniques described herein. A user interface 601 may be used to display representations of objects, such as files represented by icons 602-606, to a user. FIGS. 3-5 depict example user interfaces wherein the objects are files represented by table entries. Any user interface suitable for representing objects may be used in accordance with the disclosure herein. When a user selects an object, data representative of the selection 607 is communicated to a selection monitoring module 608. If the selection is part of an ordered list, the selection monitoring module 608 determines how the selection affects the ordinal rank of objects in the ordered list. For example, if the effect of the user selection is to append the selected object to the end of the ordered list, the selection module determines the ordinal rank of the selected object to be one greater than the ordinal rank of the last object on the ordered list. As another example, if the effect of the user selection is to prepend the selected object to the ordered list, the selection monitoring module 608 determines the ordinal rank of the selected object to be "1" and increments the ordinal rank of any other objects on the ordered list. Note that the use of "1" as the first ordinal rank is only by way of example. Some implementations may prefer to start ranks at "0". Other implementations may use symbols other than numerals to indicate ordinal rank. If the effect of the user selection is to remove the object from the ordered list or to change the ordinal rank of the selected object, the ordinal ranks of any objects remaining on the ordered list are adjusted as necessary.

In some embodiments, selecting an object to be added to an ordered list may trigger a default behavior with respect to the ordered list. For example, control-clicking an object may append the selected object to the end of the ordered list or may prepend the object to an ordered list. As another example, a user may right-click an object to bring up a context menu. Generally, the context menu may contain operations that can be performed on the selection or on the ordered list of selected objects. For example, some operations might include: play, add to playlist, cut, copy, move, delete, and so on. Some of the operations, such as for example play or add to playlist, may be order-dependent. In some embodiments, the context menu may contain an option, such as for example a "Modify Selection Order" operation, for bringing up a separate user interface to enable a user to alter the ordinal ranking of objects on the ordered list.

If the selection data 607 indicates the selection of a group of objects, the selection monitoring module 608 determines the ordinal ranking of objects within the selected group of objects and adds those objects to the ordered list, modifying the ordinal ranks of any other objects on the ordered list as necessary. Selection of a group of objects may be effectuated in various ways. Some examples include: selecting both a first and a last object in the group, for example by clicking on a first object and shift-clicking on a last object; dragging a mouse pointer to demarcate a rectangle to select objects within the rectangle; and pressing a control key while selecting multiple objects.

A rendering module 609 provides rendering information 610 to the user interface 601 to modify the view of the interface, based on information from the selection monitoring module 608, by providing or modifying visual indications of one or more ordinal ranks of objects in the ordered list. In the example interface, a semi-transparent windows 611-613 provide visual indications of the ordinal rank of three objects 603, 604, 606 in an ordered list. The rendering module 609 determines where (for example, in absolute or in relative screen coordinates) in the user interface 601 selected items 603, 604, 606 are displayed, determines where to display the visual indications of the ordinal ranks of selected items, and renders the visual indications. In some embodiments, the visual indications of the ordinal ranks will only be rendered and displayed if an order-dependent task is available to be performed on the selected objects.

Carrying on with the example of FIG. 6, if for instance a user then deselects object 603, data 607 regarding the deselection is communicated to the selection monitoring module 608 which determines that the ordinal rank of deselected object 603 must be adjusted from "2" to null and that the rank of object 606 must be adjusted from "3" to "2". That information is provided to the rendering module 609 which sends rendering information 610 to the user interface 601 to remove window 612 and modify window 613 to display a "2".

Returning again to the situation as depicted in FIG. 6, a user may choose to alter the ordinal rank of one or more objects in the ordered list. For example, a user may choose to move object 603, which currently has an ordinal rank of "2", to the end of the ordered list. Selection data 607 indicating that choice is communicated to the selection monitoring module 608, which determines that the ordinal rank of object 606, currently at "3", must be decremented to "2" and the ordinal rank of object 603 must be changed to "3". That information is communicated to the rendering module 609, which sends rendering information 610 to the user interface 601 so that window 612 will display a "3" and window 613 will display a "2".

As an example, Windows Explorer may use a List View Control to display a collection of objects, such as files. Depending on the view, the representation of each object may comprise one or more of an icon, a label, and other information about the object. Some implementations of the systems such as described herein may comprise a modified List View Control or one or more separate programs that interface with a List View control to perform at least some of the functions described herein.

Figure 7:
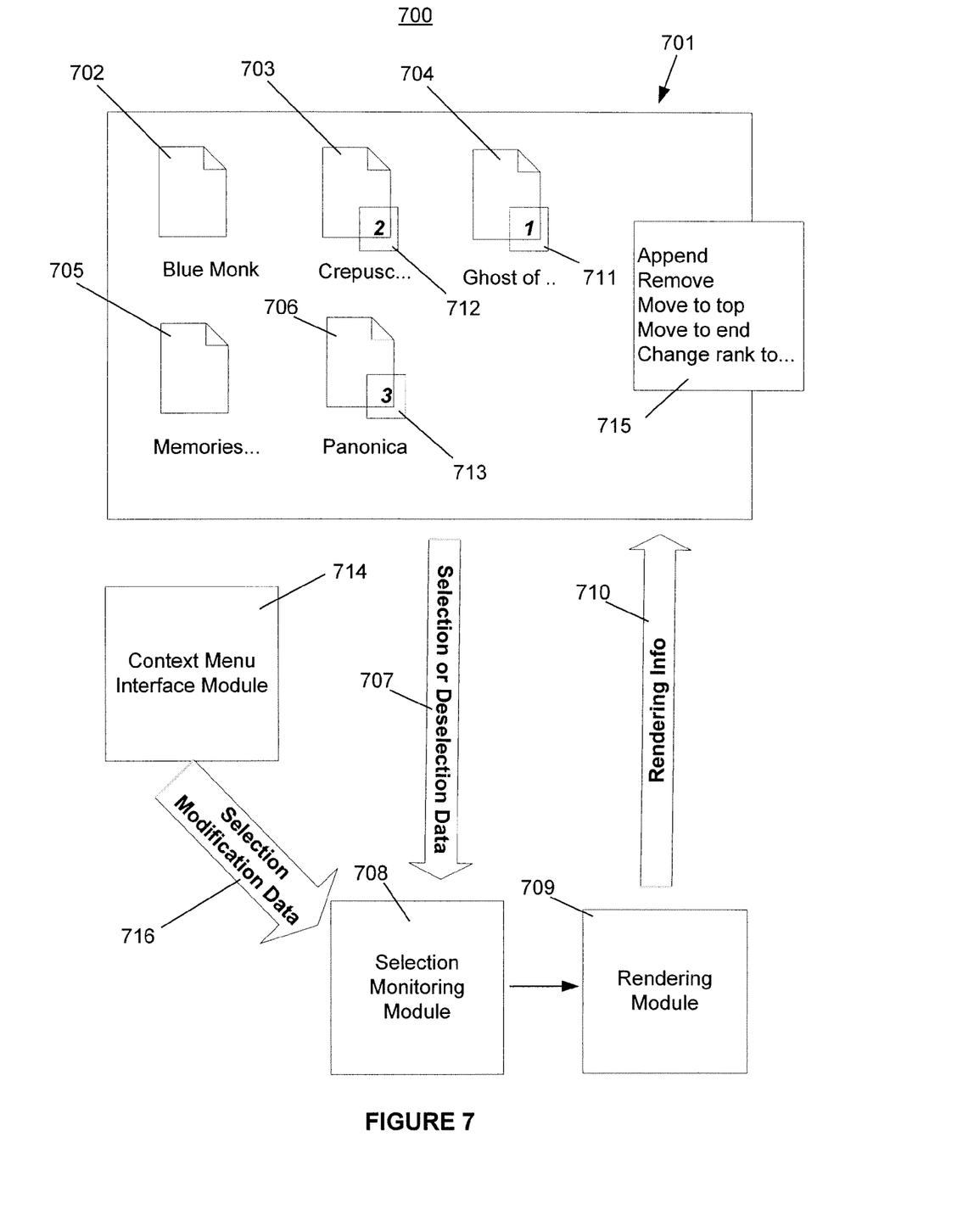
FIG. 7 is a simplified block diagram of another example of an embodiment of a system in accordance with the teachings herein.

FIG. 7 is a simplified block diagram of another embodiment of a system 700 that may implement the techniques described herein. Modifications of the ordinal rank of objects in an ordered list may be facilitated by a context menu interface module 714 that provides a menu of options related to the ordering of objects in the ordered list. A user interface 701 may be used to display representations of objects, such as icons 702-706 representing files, to a user. When a user selects an object, data representative of a selection or deselection event 707 is communicated to a selection monitoring module 708. If the selection is part of an ordered list, the selection monitoring module 708 determines how the selection affects the ordinal rank of objects in the ordered list, such as, for example, as described above in relation to FIG. 6.

A rendering module 709 provides rendering information 710 to the user interface 701 to modify the view of the interface, based on information from the selection monitoring module 708, by providing or modifying visual indications of one or more ordinal ranks of objects in the ordered list. In the example interface, semi-transparent windows 711-713 provide visual indications of the ordinal ranks of three objects 703, 704, 706 in an ordered list. The rendering module 709 determines where (for example, in absolute or in relative screen coordinates) in the user interface 701 selected items 703, 704, 706 are displayed, determines where to display the visual indications of the ordinal ranks of the selected items, and renders visual indications.

A context menu interface module 714 may be used to provide a context menu 715 of options related to the ordering of objects in the ordered list of objects. The context menu 715 may, for example, be accessed by right-clicking on an object. In the embodiment of FIG. 7, the options presented by the context menu 715 include: "Append" to add the selected item to the end of the ordered list; "Remove" to remove the selected item from the ordered list; "Move to top" to either add the item to the top of the ordered list or to move the item from its current position on the ordered list to the top; "Move to end" to either add an item to the end of the ordered list or to move an item from its current position on the ordered list to the end; and "Change rank to . . . " to present a mechanism for choosing the ordinal rank of the selected item on the ordered list. In some embodiments, the context menu 715 will only be presented if an order-dependent operation can be performed on selected objects. The context menu 715 may, in some embodiments, be presented as a submenu, such as for example a "Modify ordering" submenu, of a more general context menu. Some techniques for providing context sensitive menu systems are described in U.S. Pat. No. 5,664,133, the disclosure of which is hereby incorporated in its entirety.

Figure 8:
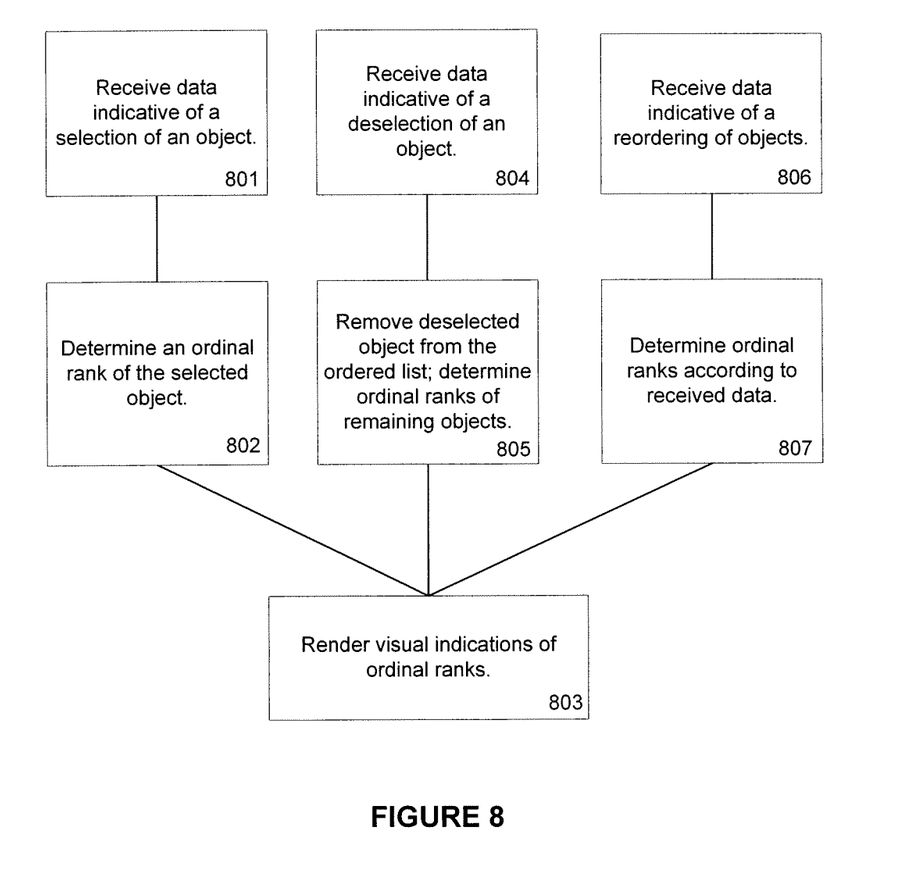
FIG. 8 is a flowchart illustrating an example method according to the teachings herein.

FIG. 8 depicts an embodiment of how the techniques described herein may be applied in practice. Data indicative of a selection of an object is received 801. The data may have, for example, been generated by a user's interaction with a user interface such as by clicking a mouse pointer on a representation of an object as described above. The data may be received by selection monitoring module, for example as described above. An ordinal rank for the selected object is determined 802. If the function of the selection is to append the selected object to an ordered list, then the ordinal rank of the selected object will be one greater than that of the last object on the ordered list. If the ordered list was empty, then the selected object will receive a default initial ordinal rank. In some embodiments, the default initial ordinal rank is "1". Some embodiments may initiate counting from an ordinal rank of "0". A visual indication of the newly determined ordinal rank is then rendered 803. The visual indication may be rendered by a rendering module such as described above. Some examples of visual indications are a semi-transparent window containing a label such as a numeral corresponding to the ordinal rank rendered in proximity to a representation of the selected object and a label placed in a row of a table corresponding to the selected object. Any visual indicator suitable for communicating information about the ordinal ranks of selected objects may be used. In some embodiments, selected objects may be copied to a clipboard. Items, such as files, copied to a clipboard may have various representations, such as for example text names, directory paths, icons, and the like. A visual representation of an ordinal rank may be provided for items on the clipboard.

Alternatively, received data may indicate the deselection of an object on an ordered list 804. In this case, the deselected item is removed from the ordered list, its ordinal rank is nullified, and the ordinal rank of remaining objects is modified as necessary 805. As an example, if an item with ordinal rank "3" is removed from a list of five objects, then the object having rank "4" is reranked to "3", the object having rank "5" is reranked to rank "4" and the object having rank "3" becomes unranked and is removed from the ordered list. Visual indications of the modified ordinal ranks are rendered 803. Thus, continuing with the example, the visual indicator of rank "3" is removed, and the visual indicators of ranks "4" and "5" are changed to "3" and "4".

Received data may indicate a reordering of objects in an ordered list 806, such as for example described in relation to FIGS. 6 and 7. The ordinal ranks of objects in the list are modified according to the received data 807. Visual indicators of the modified ranks are then rendered as appropriate 803.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It should be understood that the various techniques described herein may be implemented in logic realized with hardware or software or, where appropriate, with a combination of both. Thus, the methods and apparatus, or certain aspects or portions thereof, may take the form of program code (e.g., instructions) embodied in tangible media, such as floppy diskettes, CD-ROMs, DVDs, hard drives, EPROMS, or any other machine-readable storage medium wherein, when the program code is loaded into and executed by a machine, such as a computer, the machine becomes an apparatus for practicing the invention. Program code may be received over a network and stored locally. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs may be implemented in a high level procedural or object oriented programming language to communicate with a computer system, or may be implemented in assembly or machine language, if desired. In any case, the language may be a compiled or interpreted language, and combined with hardware implementations.

Although exemplary embodiments may refer to using aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

While the present disclosure has been described in connection with various embodiments and illustrated in various figures, it is understood that the methods and apparatus described herein may be adapted in a variety of ways. Therefore, the present disclosure should not be limited to any single aspect, but rather construed in breadth and scope in accordance with the appended claims.

What is claimed:

1. A computer-implemented method comprising:
   determining ordinal ranks of two or more objects within an ordered list;
   presenting an option that allows an ordinal rank of a selected object to be changed to a chosen ordinal rank;
   receiving data indicative of the chosen ordinal rank;
   reordering the ordinal ranks of the two or more objects based on the chosen ordinal rank; and
   rendering a visual indication of the reordered ordinal ranks of the two or more objects,
   wherein the visual indication of the reordered ordinal ranks comprises displayed labels each displayed in a window proximate to a visual representation of a corresponding one of the two or more objects, wherein the window is semi-transparent.

2. The computer-implemented method of claim 1, further comprising:
   receiving data indicative of a deselection of an object in the ordered list;
   determining an ordinal rank of one or more remaining objects in the ordered list based on the received data indicative of the deselection; and
   rendering a visual indication of the determined ordinal rank of the one or more remaining objects.

3. A system comprising:
   a memory storing processor-executable instructions;
   a processor in communication with the memory to receive the processor-executable instructions;
   a selection monitoring module configured to track modifications to an ordered list of objects, the modifications comprising changing an ordinal rank of a selected object to a chosen ordinal rank, wherein an option is presented that allows choosing the chosen ordinal rank; and
   a rendering module configured to modify a visual representation of the ordered list of objects, wherein the modified visual representation comprises a visual indication of one or more ordinal ranks of objects in the ordered list,
   the processor performing an order-dependent action on the objects in the ordered list according to their respective ordinal ranks,
   wherein the visual indication of one or more ordinal ranks comprises one or more displayed labels each displayed in a user interface proximate to a visual representation of a corresponding object in the ordered list, wherein the user interface is semi-transparent.

4. The system of claim 3 wherein the modifications to the ordered list of objects further comprise one or more of:
   appending an object to the ordered list; and
   removing an object from the ordered.

5. The system of claim 3, further comprising:
   a context menu interface module configured to provide a menu of options related to an ordering of objects in the ordered list of objects in response to a selection of the selected object in the ordered list of objects.

6. The system of claim 5 wherein the context menu interface module is configured to provide the menu of options only if an order dependent task is available to be performed on the ordered list of objects.

7. A computer readable storage medium comprising computer executable instructions that when executed on a computing device, cause the computing device to:
   determine ordinal ranks of two or more files within an ordered list of files;
   present an option that allows an ordinal rank of a selected file to be changed to a chosen ordinal rank;
   receive data indicative of the chosen ordinal rank;
   reorder the ordinal ranks of the two or more files based on the chosen ordinal rank; and
   cause a display device to exhibit a visual indication of the reordered ordinal ranks of the two or more files,
   wherein the visual indication of the reordered ordinal ranks comprises displayed labels each displayed in a user interface proximate to a visual representation of a corresponding one of the two or more files, wherein the user interface is semi-transparent.

8. The computer readable storage medium of claim 7, further comprising computer executable instructions that when executed on the computing device cause the computing device to:
   detect a user deselection of a file;
   determine an ordinal rank of one or more files remaining in the ordered list of files after removal of the deselected file; and
   cause a display device to exhibit a visual indication of the determined ordinal rank of the one or more files remaining in the ordered list of files after removal of the deselected file.

9. The computer readable storage medium of claim 7, wherein the computer executable instructions further comprise instructions that when executed on the computing device cause files in the ordered list of files to be written to a storage medium in an order of the files in the ordered list.

* * * * *